Oct. 4, 1966 F. KUPERSMITH 3,277,397

FREQUENCY MODULATOR SYSTEM HAVING A TEMPERATURE COMPENSATING AMPLIFIER CIRCUIT IN THE AFC LOOP

Filed July 3, 1963 3 Sheets-Sheet 1

INVENTOR.
FREDRIC KUPERSMITH
BY
ATTORNEY

INVENTOR.
FREDRIC KUPERSMITH
BY Percy P. Lantzy
ATTORNEY

INVENTOR.
FREDRIC KUPERSMITH
BY
ATTORNEY

3,277,397
FREQUENCY MODULATOR SYSTEM HAVING A TEMPERATURE COMPENSATING AMPLIFIER CIRCUIT IN THE AFC LOOP

Fredric Kupersmith, Park Ridge, N.J., assignor to International Telephone and Telegraph Corporation, Nutley, N.J., a corporation of Maryland
Filed July 3, 1963, Ser. No. 292,681
8 Claims. (Cl. 332—19)

This invention relates generally to frequency modulator systems and more particularly to solid state frequency modulator systems which include modulator, and variable temperature compensating amplifiers. The invention is principally characterized by a modulator circuit in which frequency variations are produced by varying the D.C. voltage level in one branch of a novel frequency-determining resonant circuit. The invention is also characterized by a novel temperature-compensating amplifier circuit. The invention can be used in a wide variety of applications, but it is particularly useful in portable FM transmitters, telemetry equipment, satellite communications systems, and the like.

One object of this invention is to provide a frequency modulator system having improved sensitivity and deviation ratio.

Another object of this invention is to provide a frequency modulator system which is lighter in weight, smaller in size, and more reliable in operation than those heretofore known in the art.

Another object of this invention is to provide a frequency modulator system which is more efficient than those heretofore known in the art.

Another object of this invention is to provide an improved frequency modulator circuit.

An additional object of this invention is to provide an improved temperature compensating amplifier.

Other objects and advantages of the invention will be apparent to those skilled in the art from the following description of one illustrative embodiment thereof, as illustrated in the attached drawings, in which.

Figure 1:
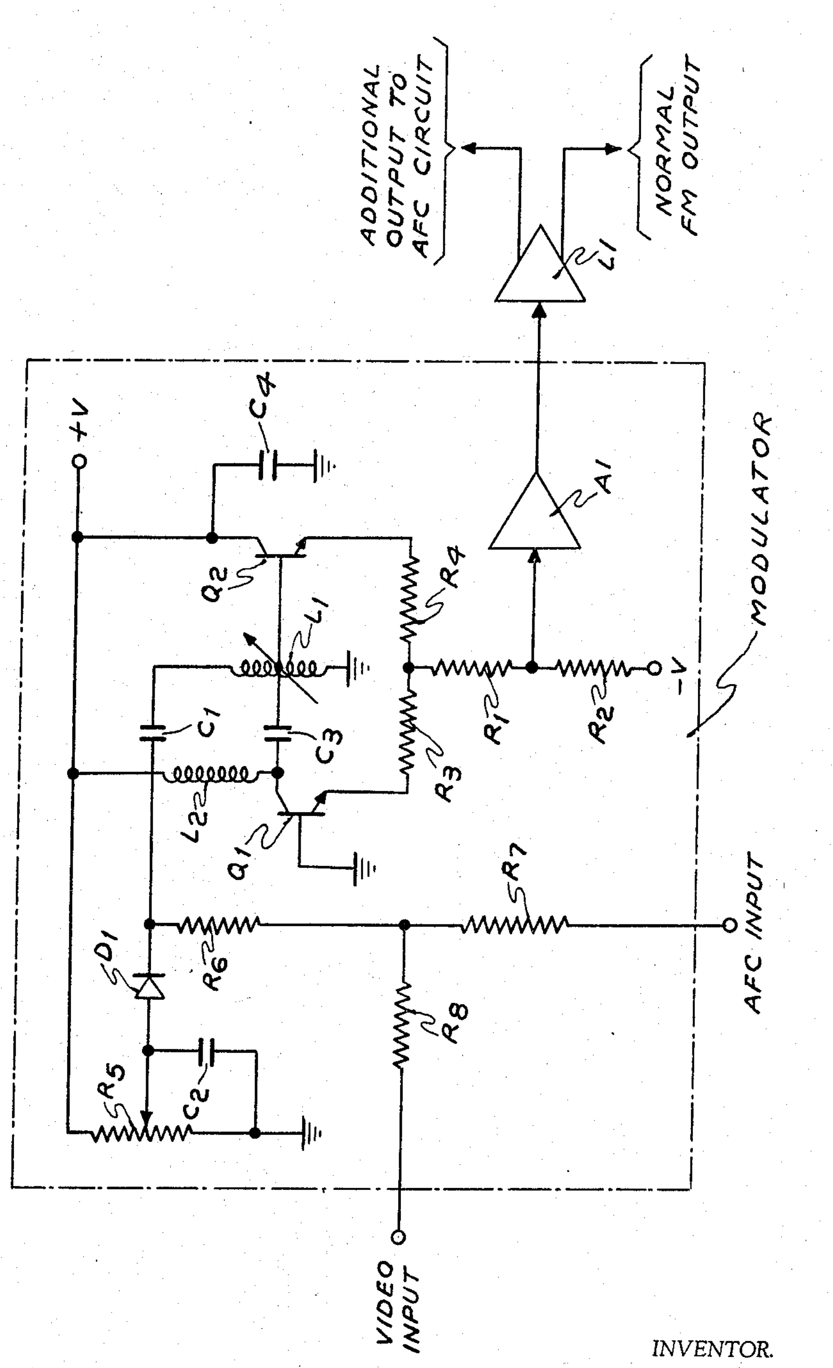
FIG. 1 is a schematic circuit diagram of one modulator circuit of this invention.

Referring to FIG. 1, the frequency modulator circuit of this invention utilizes a novel frequency determining circuit which in this particular embodiment comprises a parallel resonant circuit having four circuits in a parallel relationship coupled from the tap of inductor $L_1$ to ground. The first circuit includes the fraction of inductor $L_1$ from the tap thereof to ground. The second circuit includes the output impedance of transistor $Q_1$ from collector to ground, or more specifically includes the coupling capacitor $C_3$ coupled to the tap of inductor $L_1$ and the collector-base impedance of transistor $Q_1$ with the base connected to ground. The third circuit includes the input impedance of transistor $Q_2$ from base to ground, or more specifically includes the base-collector impedance of transistor $Q_2$ with the base connected to the tap of inductor $L_1$ and capacitor $C_4$ connected between the collector of transistor $Q_2$ and ground. $C_4$ in effect places an RF ground on the collector of $Q_2$ which function as an emitter follower. The fourth circuit includes fixed capacitor $C_1$, the fraction of inductor $L_1$ connected between the tap of inductor $L_1$ and capacitor $C_1$, and the impedance of diode $D_1$ from the cathode thereof to ground with the cathode of diode $D_1$ being connected to capacitor $C_1$. More specifically the impedance of diode $D_1$ from cathode to ground includes the impedance of the diode with the anode of the diode being connected to ground by capacitor $C_2$. Thus, capacitor $C_2$ effectively places an audio ground on the anode of diode $D_1$.

In the above resonant circuit the impedance of the power supply coupled from terminal +V to ground (not shown) will influence the impedances of certain of the parallel connected circuits in a manner well known to those skilled in the art. The effect of the power supply impedance can be easily calculated by well known prior art techniques. For instance, in the third circuit the impedance of the power supply will be in parallel with capacitor $C_4$ and in the fourth circuit the impedances of the power supply and resistor $R_5$ will be in parallel with capacitor $C_2$. Inductance $L_2$ serves an an RF choke for transistor $Q_1$ and, thus, renders the effect of the power supply impedance on the second circuit substantially negligible.

The above described parallel resonant circuit is excited by the output signal of transistor $Q_1$ coupled through coupling capacitor $C_3$. Positive feedback to transistor $Q_1$ is provided by transistor $Q_2$ by way of common emitter resistors $R_1$ and $R_2$. Resistors $R_3$ and $R_4$ provide isolation between the emitters of transistors $Q_1$ and $Q_2$.

The above described circuit elements form an oscillator circuit that normally oscillates at the parallel resonant frequency of the parallel resonant circuit, which can be adjusted manually by changing the inductance of variable inductor $L_1$. It will be understood, of course, that the stray wiring capacitances and coupling capacitor $C_3$ will influence the normal frequency of oscillation. The effect of these stray capacitances and coupling capacitor $C_3$ can, however, be easily calculated by well known prior art techniques.

In accordance with the invention, it has been found that the parallel resonant frequency of the above described parallel resonant circuit and, thus the frequency of oscillation, can be varied by varying the voltage level at which semiconductor diode $D_1$ conducts. It is believed that the frequency variation is caused by impedance changes in the diode as a function of current, and impedance changes in the transistors as a function of voltage level and frequency.

The circuit is made to oscillate by proper feedback design with the magnitude of oscillation limited by conduction of diode $D_1$.

Diode $D_1$, it should be noted, is a standard semiconductor diode rather than a variable capacitance diode, while the transistors are standard planar transistors.

With the diode current at a given level, the magnitude of oscillation will be limited to that level, and the impedance of transistors $Q_1$ and $Q_2$ cause oscillations at frequency $f_a$. When the current in the diode is changed to another given level, the magnitude of oscillation will increase or decrease, and the impedances of $Q_1$ and $Q_2$ also change to restrict oscillation to frequency $f_b$. The operation is enhanced when transistors are used whose impedances vary with frequency (capacity decreases with increasing frequency), as well as amplitude, yielding a greater more linear frequency variation with input signal. It has been found that this method of varying the frequency has an advantage of approximately 8 to 1 in terms of deviation ratio and sensitivity over prior art methods.

Figure 2:
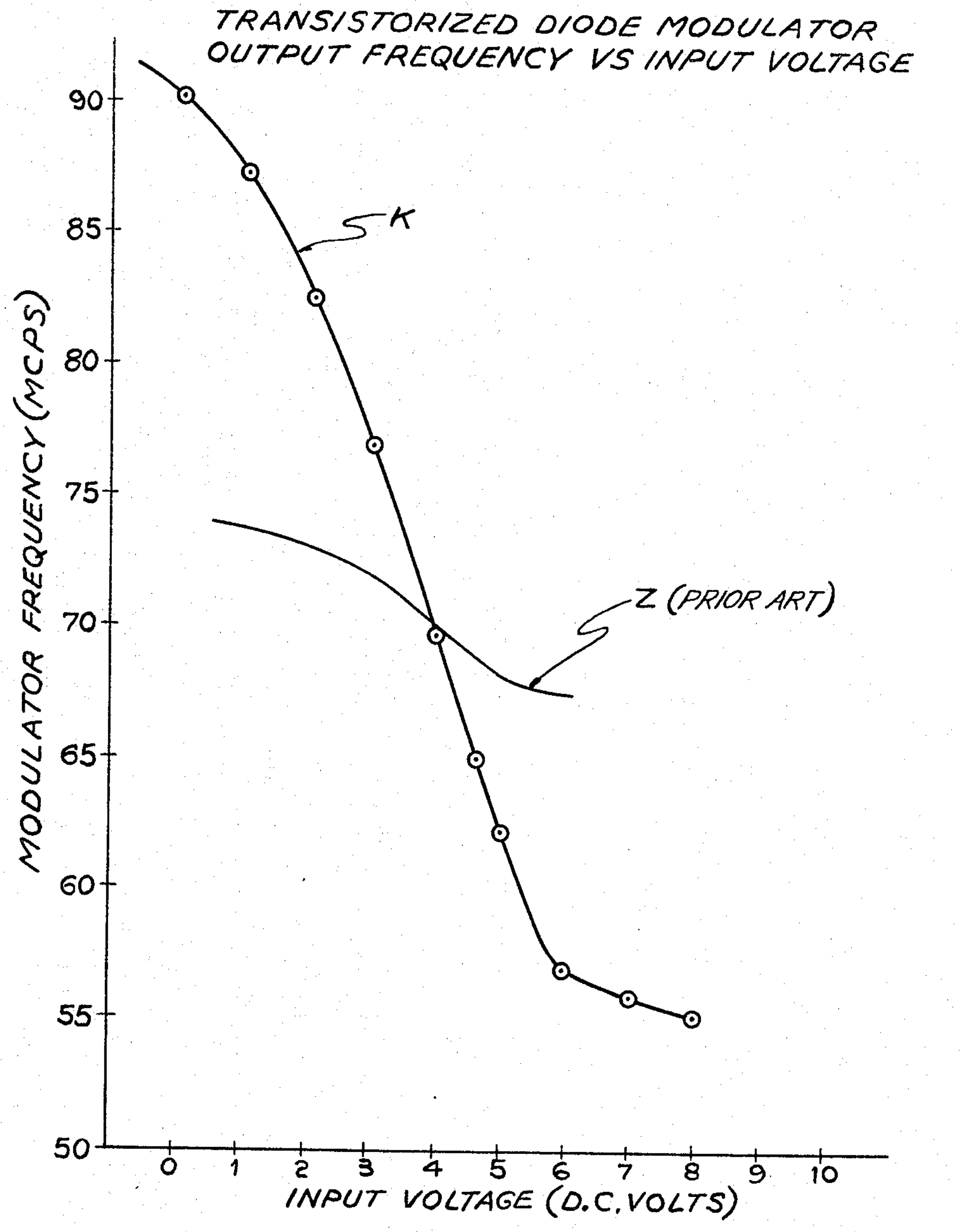
FIG. 2 is a curve of output frequency vs. input voltage of the frequency modulator showing the improvement in deviation of the modulator of this invention over the deviation of prior art modulators.

Referring now to FIG. 2, the frequency deviation characteristic of the modulator of this invention is shown at K. The deviation characteristic of prior art frequency modulators is shown at Z. An inspection of these curves will indicate that the aforementioned improvement of approximately 8 to 1 in terms of deviation capability and sensitivity is indeed present. Note that the maximum linear frequency deviation for curve Z is 5 mc. while, with the present invention, the frequency deviation is 33 mc.

In operation, the initial current level through diode $D_1$ in FIG. 1 is adjusted by a potentiometer $R_5$, which applies a forward bias potential to the anode of diode $D_1$. Variable voltages are applied to the cathode of diode $D_1$ from a video input terminal and automatic frequency control input terminal via resistors $R_6$, $R_7$ and $R_8$. The frequency modulated output of the oscillator is amplified in an amplifier and applied to a limiter circuit $L_1$ which clips off any amplitude modulations. A portion of the limiter output signal is applied to an automatic frequency control circuit, which produces a D.C. output signal proportional to the deviation of the FM output signal center frequency from a predetermined center frequency. This D.C. output signal is applied to the AFC input terminal of the above described modulator circuit to correct for center frequency drift due to temperature or voltage variations, as will be explained in detail hereinbelow.

Figure 3:
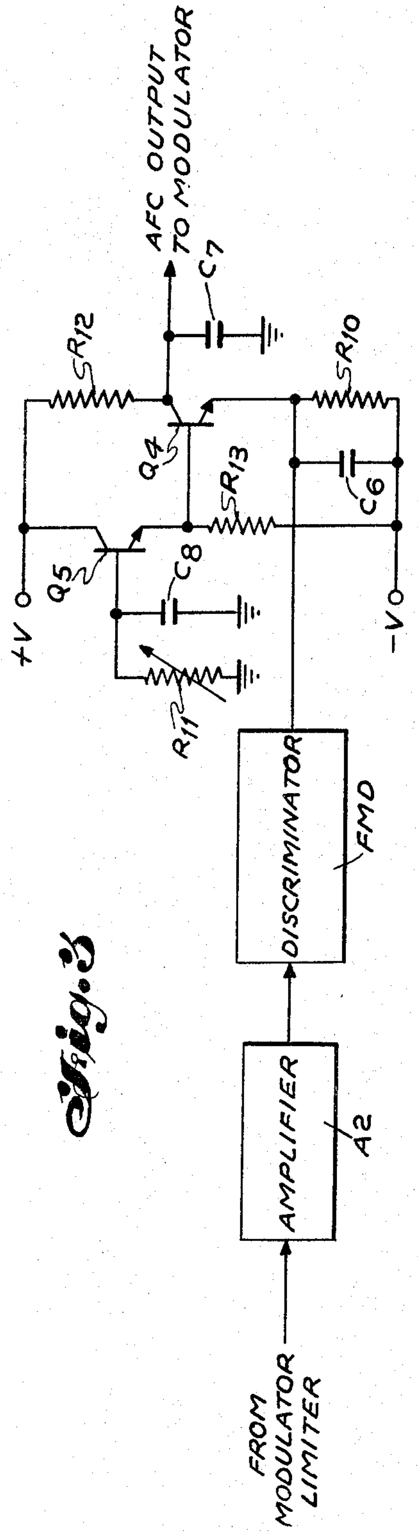
FIG. 3 is a partial schematic circuit diagram of one automatic frequency control circuit of this invention.

FIG. 3 shows one automatic frequency control (AFC) circuit of this invention which includes a novel temperature compensating output amplifier circuit. This AFC circuit comprises a conventional amplifier $A_2$ which receives the AFC output signal from the limiter (L) shown in FIG. 1 and applies its output signal to an FM discriminator FMD. The output signal of discriminator FMD is applied to the emitter of transistor $Q_4$ across resistor $R_{10}$. Audio filter capacitor $C_6$ removes the modulation component from the discriminator output signal, whereby the signal applied to the emitter of $Q_4$ will be proportional to the center frequency of the modulator output signal. $C_8$ is a bypass capacitor which establishes an audio ground. Normally, as in prior art, a temperature sensitive device may be placed at the base of transistor $Q_4$, the impedance of which varies with temperature. For proper compensation of overall systems, such as shown here, these devices are relatively high impedance and sharply reduce the gain of $Q_4$. By choosing a circuit arrangement as shown in FIG. 3, where the base of $Q_4$ is fed from an emitter follower $Q_5$, temperature compensation can be achieved without sacrificing gain, and with a simple choice of resistor $R_{11}$, determining the temperature characteristic. The compensating effect is due to the low impedance offered by the output of $Q_5$ (emitter), while maintaining near unity gain from base to emitter.

Figure 4:
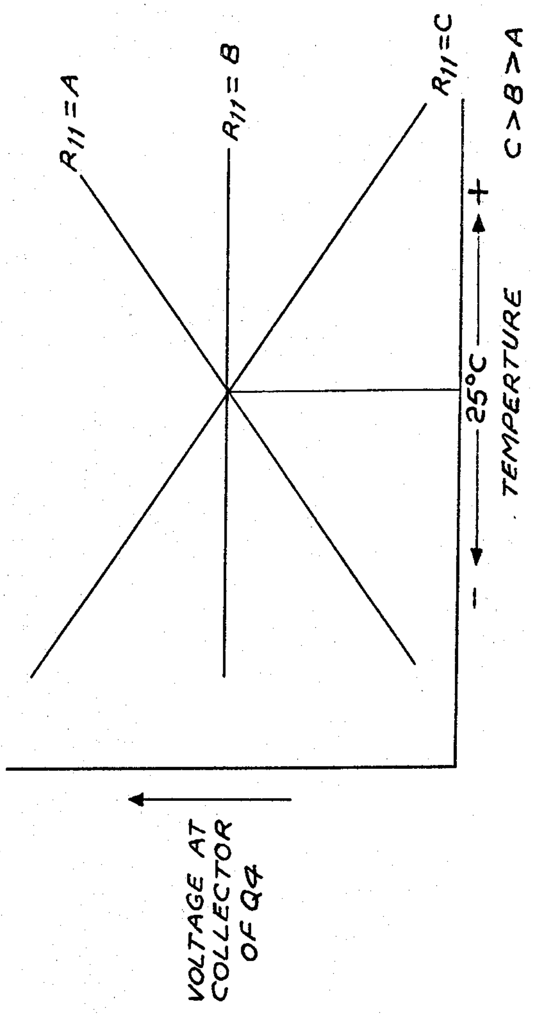
FIG. 4 is a curve showing the variation in voltage at the collector of a controlled transistor vs. temperature for various values of resistance which resistance governs the current flow through another transistor which is subjected to variations in temperature.

Transistor $Q_5$ is a temperature compensating transistor which is located so as to be subject to the same temperature environment as the other components in the AFC circuit, or, in general, be placed in any environment which is to be controlled. The current flow from the emitter of $Q_5$ to the base of $Q_4$ varies in accordance with the temperature of $Q_5$ and the value of resistor $R_{11}$, which is selected to compensate for the temperature induced variations of transistor $Q_4$, or any other temperature affected component of the circuit, or in general entire systems. For example, the voltage at the collector of $Q_4$ can be made to follow in any preselected manner as shown in FIG. 4 by proper selection of $R_{11}$, where the value of resistance for curve C is greater than B and the value of resistance for B is greater than A. This method allows the equipment, in this case modulator center frequency, to remain invariant with temperature, by using this single circuit to compensate for all elements such as amplifier drift, modulator drift, frequency discriminator drift, etc. Also, utilizing the above described technique, the use of special temperature sensitive elements is eliminated and ordinary off-the-shelf resistors may be used instead of thermistors and the like.

Similarly, this circuit can be placed in a separate or distant environment and be made to control the environmental changes of any system to achieve overall system performance in any predescribed manner, as will be well understood by those skilled in the art. The output voltage of the circuit is developed across load resistor $R_{12}$, which is shunted by another audio filter capacitor $C_7$, which further reduces the modulation component in the AFC output signal.

From the foregoing description it will be apparent that this invention provides a frequency modulator system having improved sensitivity, deviation ratio, and amplitude stability. It will also be apparent that this invention provides an improved frequency modulator circuit, and an improved automatic frequency control circuit, and an improved temperature-compensating circuit. And it should be understood that this invention is by no means limited to the specific embodiments disclosed herein, since many modifications can be made in the disclosed circuits without departing from the basic teaching of this document. Therefore, this invention includes all modifications falling within the scope of the following claims.

What is claimed is:

1. A frequency modulation system comprising:
an oscillator having
 a resonant circuit including
  a diode for varying the amplitude of oscillation of said resonant circuit in accordance with the magnitude of voltage applied to said diode;
input means coupled to said diode for varying the voltage on said diode to adjust the magnitude of current flow through said diode in accordance with an input signal to produce an oscillator output signal whose frequency and amplitude vary in accordance with said input signal;
a limiter circuit coupled to the output of said oscillator; and
a temperature responsive automatic frequency control circuit coupled between said limiter circuit and said diode to provide voltage control signals for said diode to control the frequency of said resonant circuit.

2. The combination defined in claim 1, wherein said automatic frequency control circuit comprises
a frequency modulation discriminator coupled to the output of said limiter; and
a temperature compensating amplifier circuit coupled between the output of said discriminator and said input means;
said temperature compensating amplifier comprising
 a first transistor for amplifying the output signal of said discriminator, and
 a second transistor for altering the current flow through said first transistor to compensate for temperature induced variations thereof.

3. The combination defined in claim 2, further including
a variable resistance connected to the base of said second transistor, the flow of current from the emitter thereof being a function of the value of the resistance selected and the temperature of the environment of said second transistor.

4. A frequency modulator circuit comprising:
ground potential;
a tapped inductor having one terminal connected to said ground potential;
an oscillator including
 a parallel resonant circuit having
  a first circuit including
   the portion of said inductor from said tap to said ground potential, and
  a second circuit coupled in parallel to said first circuit including
   the portion of said inductor from said tap to the other terminal of said inductor, a capacitor coupled in series to said other terminal of said inductor, and a diode coupled in series between said capacitor and said ground potential for varying the amplitude of oscillation in and the resonant frequency of said resonant circuit in accordance with the magnitude of voltage applied to said diode; and input means coupled to said diode for varying the voltage applied to said diode to adjust the magnitude of current flow through said diode in accordance with an input signal to produce an oscillatory signal whose frequency and amplitude varies in accordance with said input signal.

5. A frequency modulator circuit comprising:

ground potential;

a tapped inductor having one terminal connected to said ground potential;

an amplifier;

an oscillator including a parallel resonant circuit having a first circuit including the portion of said inductor from said tap to said ground potential;

a second circuit coupled in parallel to said first circuit including the portion of said inductor from said tap to the other terminal of said inductor, a first capacitor coupled in series to said other terminal of said inductor, and a diode coupled in series between said capacitor and said ground potential for varying the amplitude of oscillation in and the resonant frequency of said resonant circuit in accordance with the magnitude of voltage applied to said diode, and a third circuit coupled in parallel to said first and second circuits including a second capacitor coupled between said tap and the output of said amplifier, and the output impedance of said amplifier with respect to said ground potential, and a positive feedback means coupled between said resonant circuit and said amplifier; and input means coupled to said diode for varying the voltage applied to said diode to adjust the magnitude of current flow through said diode in accordance with an input signal to produce an oscillatory signal whose frequency and amplitude varies in accordance with said input signal.

6. The combination defined in claim 5, wherein said amplifier comprises a transistor amplifier; and said positive feedback means comprises an emitter follower coupled between said resonant circuit and said transistor amplifier.

7. The combination defined in claim 6, wherein the emitters of said transistor amplifier and said emitter follower are coupled to a common emitter resistor.

8. A temperature compensating amplifier circuit comprising:

a first transistor subject to temperature induced variations for amplifying an input signal;

a second transistor for altering the current flow through said first transistor to compensate for said temperature induced variations thereof;

a first resistor coupled to the base of said second transistor selected so as to compensate for the temperature variations of said first transistor;

a second resistor coupled to the emitter of said second transistor;

the emitter of said second transistor being directly connected to the base of said first transistor to vary the base current thereof in accordance with changes in temperature; and means for applying said input signal to the emitter of said first transistor.

References Cited by the Examiner

UNITED STATES PATENTS

| | | | |
|---|---|---|---|
| 2,768,293 | 10/1956 | Van Hofweegen | 332—19 X |
| 2,771,584 | 11/1956 | Thomas | 332—29 |
| 2,925,559 | 2/1960 | De Sautels | 330—23 |
| 2,956,179 | 10/1960 | Yragui | 330—23 X |
| 2,964,637 | 12/1960 | Keizer | 332—30 |
| 3,045,193 | 7/1962 | Kach | 332—19 |
| 3,046,496 | 7/1962 | Trevor | 332—19 |
| 3,048,796 | 8/1962 | Snow et al. | 332—19 |
| 3,072,860 | 1/1963 | Becking et al. | 330—23 |
| 3,089,098 | 5/1963 | Noe | 330—19 |
| 3,100,876 | 8/1963 | Schulz | 330—23 X |
| 3,109,943 | 11/1963 | Merlen | 307—88.5 |

OTHER REFERENCES

McMahon et al.: Voltage-Variable Capacitors-State of the Art, Electronic Industries, 12–1959, p. 93.

HERMAN KARL SAALBACH, *Primary Examiner.*

ALFRED L. BRODY, ELI LIEBERMAN, P. L. GENSLER, *Assistant Examiners.*